United States Patent [19]

Teraslinna

[11] 4,402,008
[45] Aug. 30, 1983

[54] WIDEBAND SWITCHING ARCHITECTURE

[75] Inventor: Kari T. Teraslinna, Woodridge, Ill.

[73] Assignee: Bell Telephone Laboratories, Incorporated, Murray Hill, N.J.

[21] Appl. No.: 296,810

[22] Filed: Aug. 27, 1981

[51] Int. Cl.³ .............................................. H04N 7/10
[52] U.S. Cl. .................................. 358/86; 179/2 TS; 340/825.80; 358/181
[58] Field of Search .......................... 358/86, 181, 85; 179/2 TV, 2 TS; 307/40, 241, 243, 244; 340/825.79, 825.80, 825.85, 825.86, 825.87, 825.88

[56] References Cited

U.S. PATENT DOCUMENTS

| | | | |
|---|---|---|---|
| 4,125,855 | 11/1978 | Davis | 357/45 |
| 4,302,771 | 11/1981 | Gargini | 358/86 |
| 4,331,950 | 5/1982 | Barabas | 358/181 |
| 4,349,750 | 9/1982 | Geurts | 307/244 |

OTHER PUBLICATIONS

*BBC Engineering,* Jul. 1970, No. 83, pp. 19–28, (Gt. Britain), Shelton, W. T., "Solid-State Video Switching Matrix".

*NEC Research & Development,* Jul. 1981, No. 62, pp. 49–56, (Japan), "Model AO-3-A Video Switching Equipment of Television Network".

*Primary Examiner*—Howard Britton
*Attorney, Agent, or Firm*—F. W. Padden

[57] ABSTRACT

A communication method and wideband switching network in which wideband signals are communicated through the network with minimal crosstalk between the wideband signals. Minimal crosstalk is achieved by a network architecture and by grounding both ends of all unused video paths. Each stage of the network has a plurality of switching input and output arrays. Each input array has one input terminal and each output array has one output terminal. Output and input terminals of the input and output arrays, respectively, are interconnected to form a nonblocking stage. Each array is one integrated circuit (IC), and crosstalk is reduced by allowing only one wideband signal to be present in an IC at any one time and by grounding all unused output and inputs in the arrays.

12 Claims, 4 Drawing Figures

VIDEO SWITCH 105

ARRAY 303

WIDEBAND SWITCHING ARCHITECTURE

TECHNICAL FIELD

This invention relates to a method and a wideband network for switching wideband signals and in particular, relates to reducing the crosstalk between video signals within the switching network.

BACKGROUND OF THE INVENTION

The term "wideband signals" is defined to mean digital signals having a range of 1.544 million bits per second (Mbps) to 6 Mbps or full analog baseband color video signals. The high frequencies required for wideband transmission, as compared to those required for voice transmission, result in more severe crosstalk problems within the switching network. In particular, when a space division network is using a crosspoint array which is fabricated using semiconductor technology, the crosstalk problems become increasingly more pronounced at higher frequencies. There are two main contributors to crosstalk problems in a semiconductor crosspoint array. One is the leakage from the conductors within the semiconductor array to the substrate caused by the relatively poor insulating qualities of the substrate and the capacitive effect due to the close proximity of signals within the semiconductor array. The second factor is that a crosspoint's switching transistor's internal structure has capacitive coupling between the input and output when in the OFF state. At higher frequencies, this capacitance becomes a lower and lower impedance which results in increased crosstalk. As a signal is switched through a normal multistage telephone-type network, these factors cause the crosstalk to increase in a cumulative, linear manner. The total crosstalk is equal to the sum of the crosstalk for each stage of the network within the network.

The approach taken by the prior art to eliminate this crosstalk problem has been to concentrate on the crosspoints themselves within the semiconductor array and attempt to reduce the OFF state capacitance of the crosspoint, to increase the dielectric isolation to the substrate and to physically distribute the conductors within the semiconductor array in a manner so as to reduce the capacitive coupling between conductors. These techniques have not been successful due to the basic limitations of the semiconductor devices and the fact that using these techniques has led to larger semiconductor chips, hence, lower yields and higher costs.

In view of the foregoing, there exists a need for a switching network architecture which can utilize semiconductor arrays which are easy to manufacture and meet the necessary crosstalk requirements.

SUMMARY OF THE INVENTION

The foregoing problems are solved and a technical advance is achieved in accordance with the principles of this invention incorporated in an illustrative method and structured embodiment in which wideband signals are communicated through a wideband switching network with a minimum of crosstalk and noise between the wideband signals.

The illustrative wideband switching system comprises a plurality of wideband signal sources connected to a plurality of wideband receivers by a multistage network which is controlled by a switch controller. Each stage comprises a plurality of switching elements with each switching element having a plurality of input and output switching arrays. Within a switching element, each input switching array has an output terminal connected to an input terminal of every output switching array.

A departure in the art provided by this invention is that each switching array is one semiconductor part; and each input switching array has only one input terminal for connection to an external wideband signal and each output switching array has only one output terminal for transmitting a wideband signal. By reducing the number of external wideband signal connections to one per semiconductor part, crosstalk is reduced.

Each input switching array has a pair of crosspoint devices associated with each output terminal. One crosspoint device is capable of connecting the associated output terminal to the input terminal, and the other crosspoint device is capable of connecting the associated output terminal illustratively to ground potential. The switch controller controls the crosspoint devices so that one output terminal is connected to the input terminal which is connected to the desired signal and the remaining output terminals are connected to ground potential. The connection of the remaining output terminals to ground potential reduces the effect of crosstalk within the switching input array by providing a low impedance path to ground for any undesired signals.

Similarly, each output switching array has a pair of crosspoint devices associated with each input terminal. One crosspoint device is capable of connecting the associated input terminal to the output terminal and the other crosspoint device is capable of connecting the associated input terminal to ground potential. The switch controller controls the crosspoint devices so as to connect one input terminal which is connected to the desired signal to the output terminal and the remaining input terminals to ground potential which reduces crosstalk.

To further reduce crosstalk, if no wideband signal is to be transmitted via a particular switching output array, the switching controller controls the crosspoint devices within the switching output array such that the output terminal is connected to an input terminal of the switching output array which is being connected to ground potential by a crosspoint device in an input switching array via the associated output terminal of that input switching array.

The wideband switching network may be used to connect video vendors to video receivers for the reception of video signals. One video vendor can be transmitting simultaneously, the same video signal to one or more video receivers via the wideband switching network.

The novel method is provided for communicating wideband signals from a wideband signal source to a wideband signal receiver. The steps involve communicating the wideband signal from the wideband signal source through an input array and transferring the signal from an output terminal of the input array through an output array to the wideband signal receiver while controlling all other terminals in the various arrays to known states to reduce crosstalk. The remaining terminals within the switching network are held to known states by the steps of connecting all other input and output terminals in the used output and input arrays, respectively, to ground, connecting all output terminals of all other input arrays to ground, connecting output terminals of other unused output terminals to ground via a connection to the used input array and connecting all other input terminals of the unused output arrays to ground.

DETAILED DESCRIPTION

Figure 1:
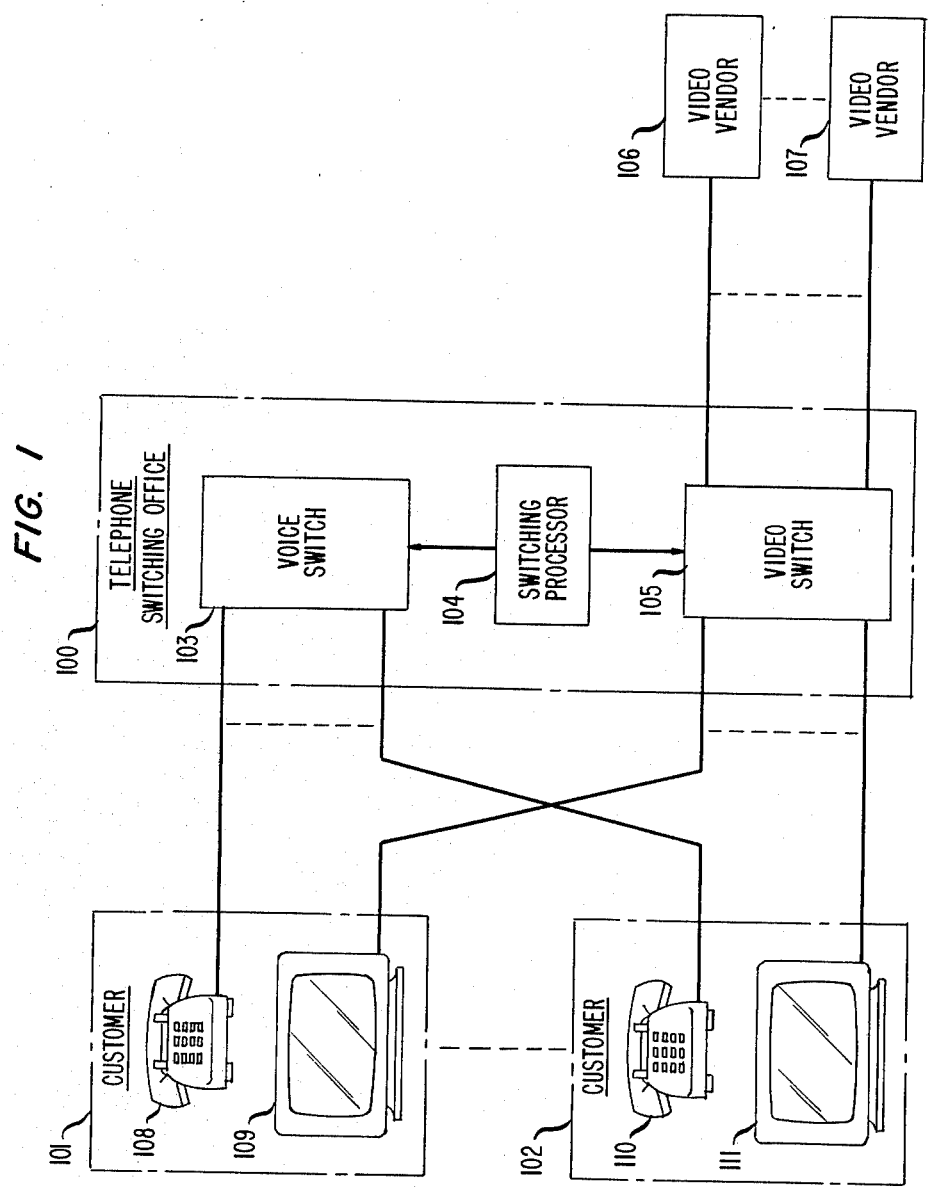
FIG. 1 shows in block diagram form, a communication switching system utilizing a voiceband switch for the switching of telephone conversations and a video band switch for the switching of video information, in accordance with the present invention.

The following describes in greater detail, the manner in which the switching array functions to provide video service through a video switching network. FIG. 1 shows a telephone system which is capable of not only switching telephone voice conversations, but, also, in switching video information. Telephone switching office 100 consists of switching processor 104 which performs the necessary high level control functions to properly switch the voice conversations by setting up the necessary paths through voice switch 103. In addition, switching processor 104 provides access to the video vendors 106 through 107 for customers 101 through 102 by setting up the necessary paths in video switch 105. The types of video services which would be provided by video vendors 106 through 107 would be movies, catalog service, reference information and travel information. Video switch 105 has two important characteristics. The first characteristic is that any video vendor is capable of transmitting to one or all of the customers attached to video switch 105. The second characteristic is that because of its architectural design, video switch 105 is capable of providing high quality signals to customers 101 through 102 by reducing crosstalk between the signals being supplied by video vendor 106 through 107.

Figure 2:
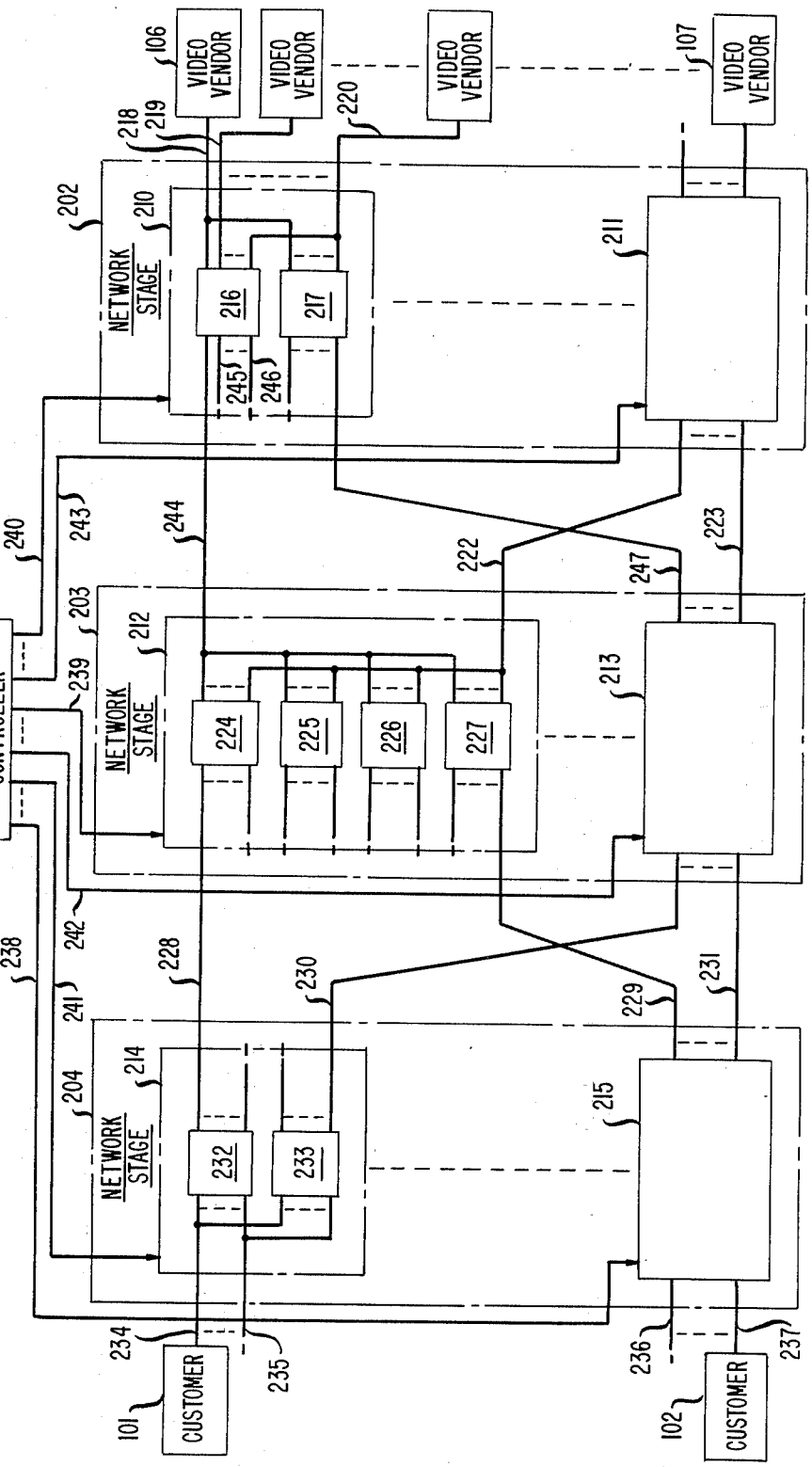
FIG. 2, in block diagram, shows the network modules and control which comprise the video switch of FIG. 1.

Details of video switch 105 are illustrated in FIG. 2. Video switch 105 consists of video switch controller 201 and three network stages 202 through 204. The network stages 202 through 204 form a nonblocking, broadcast switching network, such that, any video vendor can be simultaneously transmitting to one or all of the customer sites 101 through 102. Video switch controller 201 receives commands from switching processor 104 directing that certain paths be set up in each of the network stages. Network stage 202 is comprised of 16 modules, two of which are illustrated as modules 210 and 211. Network stage 203 is comprised of 31 modules, two of which are illustrated as modules 212 and 213. Network stage 204 comprises 64 modules which are illustrated by modules 214 and 215. Each module is comprised of switching elements, each of which has an identical internal structure. The internal structure of the switching elements is detailed in FIG. 3.

Network stage 202 has connected to it, 256 video vendors, of which video vendors 106 and 107 are examples. The internal structure of the modules which comprise network stage 202 is illustrated by module 210. Module 210 has 16 input conductors 218 through 220, and 31 output conductors 244 through 247. Module 210 has two switching elements 216 and 217. Module 210 has 16 video vendors connected to it on its inputs and it has one output conductor connected to an input conductor of each of the modules which comprise network stage 203. For example, output conductor 244 from switching element 216 is connected to the input of module 212, and output conductor 247 from element 217 is connected to the input of module 213. This interconnection allows any module in stage 202 to set up path to any module in stage 203.

Network stage 203 is comprised of 31 modules, of which module 212 is an example. Module 212 is comprised of four switching elements 224 through 227. Each of the switching elements 224 through 227 is connected to one of the output conductors from each module of network stage 202. Module 212 has 64 output conductors, each of which connects to one module in network stage 204. For example, output conductor 228 connects to module 214 and output conductor 229 connects to module 215.

Network stage 204 is comprised of 64 modules, of which modules 214 and 215 are examples. Module 214 has two switching elements 232 and 233, and has 31 inputs and 16 outputs. Module 214 has one input connected to each of the modules which comprise network stage 203. Module 214 has an output conductor connected to each customer such as customer 101, via the 16 output conductors 234 through 235.

An example of the operation of the video switch 105 is given by the following example, which illustrates video vendor 106 transmitting to customer 101 and customer 102. Switching processor 104 via video switch controller 201 sets up the following connections by transmitting control signals via cables 240, 239, 238, 241, 242 and 243. Switching element 216 is configured to take input conductor 218 and transmit the signals thereon to output conductor 244. Switching element 224 takes the signal being transmitted via conductor 244 and transfers this information to output conductor 228, and switching element 232 takes the information being transmitted via conductor 228 and transmits this information to customer 101 via output conductor 234. Video vendor 106 transfers information to customer 102 through the following paths. The information being transmitted via conductor 244 is transferred by switching element 227 to conductor 229 for transmission to module 215. Module 215 takes the information being transmitted via conductor 229 and transmits this information to customer 102 via conductor 237.

Figure 3:
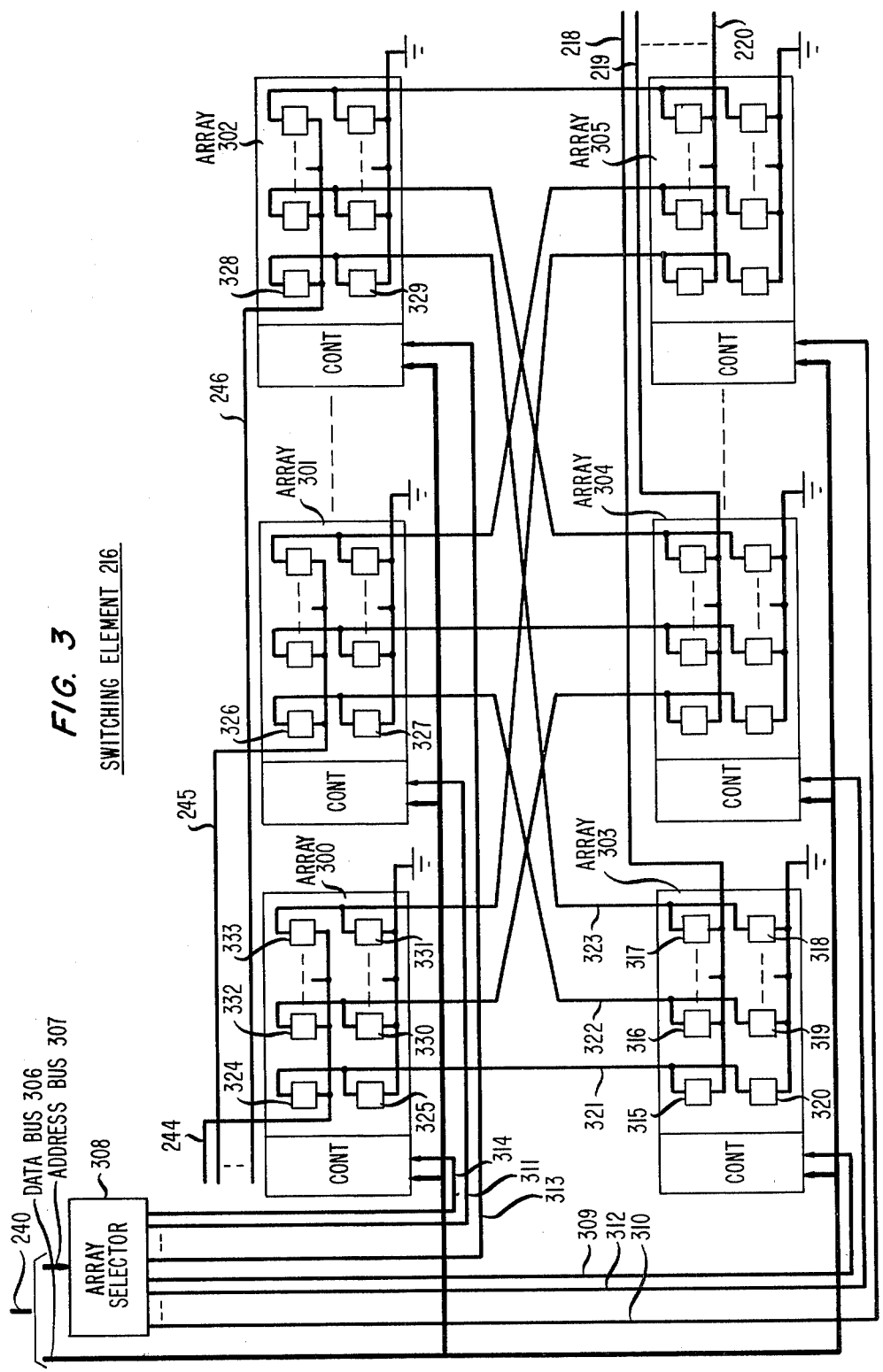
FIG. 3 shows in greater detail the internal structure of a switching element shown in FIG. 2.

A detailed block diagram of switching element 216 is shown in FIG. 3, and the other switching elements are similar in construction. Switching element 216 is comprised of array selector 308 and 32 arrays, 300 through 305. Arrays 300 through 302 are output arrays, and arrays 303 through 305 are input arrays. Each array consists of one integrated circuit and has either only one input or on output terminal, depending on whether it is an input or output array, respectively. The output terminals and input terminals for input and output arrays, respectively, are connected to ground if not being used to transfer a signal. These two techniques reduce crosstalk by reducing the number of crosstalk sources and by providing low impedance paths to ground for spurious signals. A detailed description of an array is given in the following section describing FIG. 4.

Array selector 308 decodes the address signals being transmitted via address bus 307 via cable 240 from video switch controller 201. The decoded information is used to determine which array is to store the information transmitted via data bus 306 into its internal latch. Array selector 308 decodes the information transmitted via address bus 307 and transmits a "1" on conductors 309 through 314 to the array which is to store the information being transmitted via data bus 306.

For example, array 303 is responsive to the transmission of a "1" via conductor 309 from array selector 308 to store the information being transmitted via data bus 306. This information is used to control the operation of crosspoints 315 through 320. Array 303 consists of 32 crosspoints and the crosspoints are grouped as pairs. For example, crosspoints 315 and 320 comprise one pair and crosspoints 316 and 319 comprise another pair. With respect to each pair of crosspoints, one of the crosspoints is ON and the other is OFF. Within array 303, crosspoint 315 is either connecting conductor 218 to conductor 321 or crosspoint 320 is connecting conductor 321 to ground. Crosspoint pair 316 and 319 and crosspoint pair 317 and 318 function in the same manner, with respect to conductors 322 and 323.

As an example of how switching element 216 functions in connecting the 16 input conductors 218 through 220 to the 16 output conductors 244 through 246, consider the manner in which the arrays would have to be set up by the video switch controller 201 via the array selector 308 and the control section of arrays 300 through 305 to connect input connector 218 to output connector 245. Within array 303, crosspoint 316 would be turned ON connecting conductor 218 to conductor 322; and within array 301, crosspoint 326 would be ON connecting conductor 322 to output conductor 245. Also, within array 303, all of the crosspoints 318 through 320, except crosspoint 319, are ON connecting the 15 conductors 321 through 323 to ground except for conductor 322. For example, crosspoint 320 is ON, thus, connecting conductor 321 to ground. Similarly, within array 300, crosspoint 325 is ON also connecting conductor 321 to ground, and this is true of all of the 15 arrays 300 through 302 except array 301. All of these arrays would connect the conductor from array 303 to ground. Array 301 would ground all other input conductors.

A second example is where input conductor 218 is to be simultaneously connected to output conductors 244, 245 and 246. Within array 303, input conductor 218 is connected to conductors 321, 322 and 323 by turning ON crosspoints 315, 316 and 317. Within array 300, crosspoint 324 is turned ON connecting conductor 321 to output conductor 244; in array 301, crosspoint 326 is turned ON connecting conductor 322 to output conductor 245; and in array 302, crosspoint 328 connecting conductor 323 to output conductor 246. In this example, all other output conductors from array 303 are connected to ground via crosspoints 318 through 320, with the exception of crosspoints 318, 319 and 320. In addition, the conductors connected to ground within array 303 are connected to ground also in the output arrays, with the exception of arrays 300, 301 and 302.

In addition, if no signal is being transmitted through an output array, the output conductor of the array is connected to a grounded conductor from an input array. For the first example given above and assuming no signal being transmitted on output conductor 244, video switch controller 201 turns crosspoint 324 ON which connects conductor 244 to ground via conductor 321, and crosspoint 320. The input crosspoints 330 and 331 are turned ON and output crosspoints 332 through 333 are turned OFF. The result is that output conductor 244 is connected to ground which reduces crosstalk being coupled into conductor 244.

From the foregoing description of switching element 216 which is illustrative of all the switching elements in video switch 105 and the examples relating to that description, each of the input arrays 303 through 305 has only one input conductor over which the video signal is transmitted. This means that there can be no crosstalk within any array between video signals, since, only one video signal is present in the array. Also, each output array 300 through 302 only has one output conductor for transmission of a video signal. Each array, regardless of whether it is an output or an input array, has only one video signal being transmitted through it at any point in time, and all other conductors, except for the conductors being used to transmit the video signal are grounded. This grounding of all unused conductors provides a low impedance path for any potential crosstalk sources. Each switching element achieves a two-crosspoint isolation effect, since the video signal transmitted through a crosspoint in an input array and a crosspoint in an output array.

Figure 4:
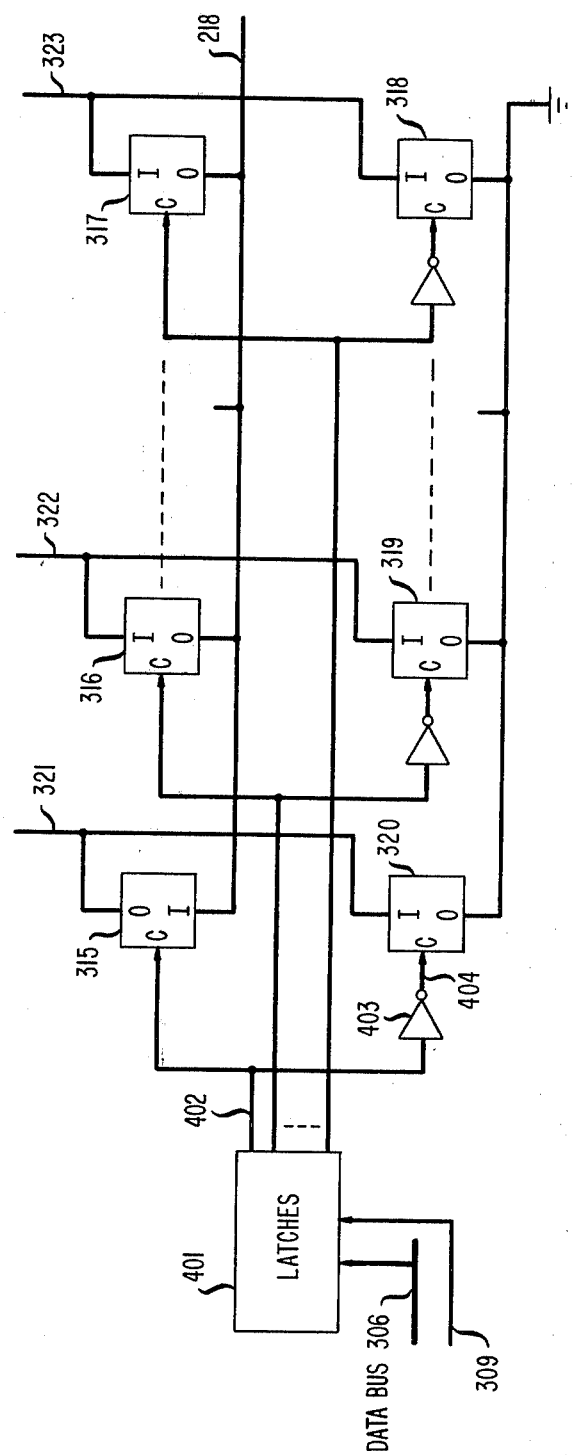
FIG. 4, in block diagram form, shows the details of the switching arrays of FIG. 3.

A detailed block diagram is shown of array 303 of FIG. 3 in FIG. 4, and is illustrative of all of the various arrays within video switch 105. The crosspoints 315 through 320 are bilateral switches which are capable of transmitting the video signal from the I terminal to the O terminal, or vice versa. A crosspoint is turned ON and will conduct the signal from either the I to the O terminal, or vice versa, when a "1" is present at the C input terminal. The crosspoints are controlled by the content of latches 401. The video switch controller 201 of FIG. 2 writes information into latches 401 by transmitting 16 bits on data bus 306 which is part of cable 240 and by transmitting address bits on address bus 307 which is also part of cable 240. Array selector 308 decodes the address bits being transmitted via address bus 307 and transmits a "1" on conductor 309 if the data is to be stored in latches 401. Latches 401 respond to the "1" being transmitted via conductor 309 to store the 16 bits being transmitted via data bus 306.

Each crosspoint pair, such as, 315 and 320 has associated with it, one bit in latches 401 which is used to control the state of the particular crosspoint pair. For example, the state of the bit associated with crosspoint pair 315 and 320 is transmitted via conductor 402. If a "1" is being transmitted via conductor 402, then crosspoint 315 is turned ON since there is a "1" present at its C input and crosspoint 320 is turned OFF. Crosspoint 320 is turned OFF since inverter 403 inverts the "1" being transmitted via conductor 402 and transmits a "0" via conductor 404 to the C input of crosspoint 320. The other crosspoint pairs function in a similar manner.

A detailed description of a crosspoint suitable for use as crosspoints 315 through 318 is detailed in U.S. Pat. No. 4,125,855 of J. A. Davis and W. J. Ooms. Davis describes a low loss, bilateral analog crosspoint suitable for fabrication in a semiconductor array, such as, array 303.

It is to be understood that the above-described embodiments are merely illustrative of the principles of the invention and that other arrangements may be devised by those skilled in the art without departing from the spirit and scope of the invention.

What is claimed is:

1. For use in a wideband switching system for the switching of wideband signals with a minimal of crosstalk between switched wideband signals:
   a wideband switching network;
   a source of potential;
   a plurality of wideband signal sources each of said sources transmitting a wideband signal to said network;
   a plurality of wideband signal receivers each connected to said network and having capabilities of receiving one of said transmitted signals;
   said network having a first and a second stage;
   each of said stages having a plurality of switching elements;
   each of said switching elements having a plurality of input switching arrays and a plurality of output switching array with each of said input switching arrays having one input terminal and a plurality of output terminals and each of said output switching arrays having one output terminal and a plurality of input terminals;
   each of said input switching arrays further comprises a first set of crosspoints for connecting that input switching array's input terminal to one of that input switching array's output terminals and a second set of crosspoints for connecting all other output terminals of that input switching array to said source of potential;
   each of said output switching arrays further comprises a third set of crosspoints for connecting that output switching array's output terminal to one of that output switching array's input terminals and a fourth set of crosspoints for connecting all other input terminals of that output switching array to said source of potential;
   each of said output terminals of said input switching arrays connected to a different one of said input terminals of said output switching arrays within each of said switching elements;
   each of said input terminals of said input switching arrays of said first stage connected to a different one of said wideband signal sources, and each of said output terminals of said switching output arrays of said first stage connected to a different one of said input terminals of said input switching arrays of said second stage; and
   each of said output terminals of said switching output array of said second stage connected to a different one of said wideband signal receivers.

2. A method of communicating a wideband signal from one of a plurality of wideband signal sources to one of a plurality of wideband signal receivers through a wideband switching network having output arrays which have one output terminal and a plurality of input terminals with first switching means for connecting any one of said input terminals to said output terminal and second switching means for connecting all other input terminals to a prescribed potential, and each of said output terminals connected to a wideband signal receiver; and said wideband switching network having input arrays which have a plurality of output terminals and one input terminal with third switching means for connecting any one of said output terminals to said input terminal and fourth switching means for connecting all other output terminals to said prescribed potential, and each of said input terminals of said input arrays connected to one of said wideband signal sources; and each of said output terminals of said input arrays connected to an individual one of said input terminals of said output arrays;
   communicating said wideband signal from the input terminal of one of said input arrays connected to said one of said wideband signal sources to the one of said output terminals of one of said input arrays associated with said one of said output arrays connected to said wideband signal receiver;
   transferring said wideband signal from said one of said output terminals of said one of said input arrays through the associated input terminal of said one of said output arrays to the output terminal of said one of said output arrays;
   sending said wideband signal to said wideband receiver from said output terminal of said one of said output arrays;
   connecting individually all other input terminals and output terminals of said input and output arrays to said prescribed potential.

3. The invention of claim 2 wherein the step of connecting all other input terminals and output terminals is characterized by
   connecting all other of said input an output terminals of said ones of said input and output arrays to said prescribed potential via an impedance source;
   connecting all of said output terminals of other of said input arrays which are connected to said other input terminals of said one of said output arrays to said prescribed potential via said impedance source;
   connecting the ones of said input terminals of other of said output arrays which are connected to said output terminals of said one of said input arrays to said prescribed potential via said impedance source.

4. For use in a video switching system for switching video signals with minimal crosstalk between switched video signals;
   a video switching network having an input switch means having a single input terminal and a plurality of output terminals, an output switch means having a plurality of input terminals and a single output terminal;
   means for connecting each of said input terminals to an individual one of said output terminals of said input switch means;
   said input and output switch means having a plurality of crosspoint elements operable for establishing one and more connections from said input terminal through said connecting means to said single output terminal;
   a source of potential;
   control means responsive to a receipt of instruction signals for operating selected ones of said crosspoint elements for establishing said connections and concurrently connecting all other of said crosspoint elements to said potential source.

5. For use in a wideband switching system for the switching of wideband signals with a minimal of crosstalk between switched wideband signals:
   a wideband switching network;
   a plurality of wideband signal sources each of said sources transmitting a wideband signal to said network;
   a plurality of wideband signal receivers each connected to said network and having capabilities of receiving one of said transmitted signals;
   said network having a first and a second stage;

each of said stages having a plurality of switching elements;

each of said switching elements having a plurality of input switching arrays and a plurality of output switching array with each of said input switching arrays having one input terminal and a plurality of output terminals and each of said output switching arrays having one output terminal and a plurality of input terminals;

each of said output terminals of said input switching arrays connected to a different one of said input terminals of said output switching arrays within each of said switching elements;

each of said input terminals of said input switching arrays of said first stage connected to a different one of said wideband signal sources, and each of said output terminals of said switching output arrays of said first stage connected to a different one of said input terminals of said input switching arrays of said second stage;

each of said output terminals of said switching output array of said second stage connected to a different one of said wideband signal receivers;

a switching controller for generating a plurality of control signals;

one of said input arrays having a plurality of switching means with each of said switching means associated with one of said output terminals;

an impedance source;

each of said switching means having a first crosspoint device responsive to a first one of said control signals for connecting said associated output terminal to said input terminal of said one of said input arrays and having a second crosspoint device responsive to a second one of said control signals for connecting said associated output terminal to said impedance source; and said switching controller generates and transmits said first one of said control signals to one of said switching means and said second one of said control signals to all other switching means whereby within said one of said input array one of said output terminals is connected to said input terminal and all other ones of said output terminals are connected to said impedance source.

6. For use in a wideband switching system for the switching of wideband signals with a minimal of crosstalk between switched wideband signals:

a wideband switching network;

a plurality of wideband signal sources each of said sources transmitting a wideband signal to said network;

a plurality of wideband signal receivers each connected to said network and having capabilities of receiving one of said transmitted signals;

said network having a first and a second stage;

each of said stages having a plurality of switching elements;

each of said switching elements having a plurality of input switching arrays and a plurality of output switching array with each of said input switching arrays having one input terminal and a plurality of output terminals and each of said output switching arrays having one output terminal and a plurality of input terminals;

each of said output terminals of said input switching arrays connected to a different one of said input terminals of said output switching arrays within each of said switching elements;

each of said input terminals of said input switching arrays of said first stage connected to a different one of said wideband signal sources, and each of said output terminals of said switching output arrays of said first stage connected to a different one of said input terminals of said input switching arrays of said second stage;

each of said output terminals of said switching output array of said second stage connected to a different one of said wideband signal receivers;

a switching controller for generating a plurality of control signals;

an impedance source;

one of said output arrays having a plurality of switching means with each of said switching means associated with one of said input terminals of said one of said output arrays;

each of said switching means having a first crosspoint device responsive to a first one of said control signals for connecting said associated input terminal to said output terminal of said one of said output arrays and a second crosspoint device responsive to a second one of said control signals for connecting said associated input terminal to said impedance source; and said switching controller generates and transmits said first one of said control signals to one of said switching means and said second one of said control signals to all other of said switching means whereby within said one of said output arrays said output terminal is connected to said input terminal associated with said one of said switching means and all other of said output terminals are connected to said impedance source.

7. The invention of claim 6 wherein each of said crosspoint devices comprises semiconductor circuitry.

8. For use in a wideband switching system for the switching of wideband signals with a minimal of crosstalk between switched wideband signals:

a wideband switching network;

a plurality of wideband signal sources each of said sources transmitting a wideband signal to said network;

a plurality of wideband signal receivers each connected to said network and having capabilities of receiving one of said transmitted signals;

said network having a first and a second stage;

each of said stages having a plurality of switching elements;

each of said switching elements having a plurality of input switching arrays and a plurality of output switching array with each of said input switching arrays having one input terminal and a plurality of output terminals and each of said output switching arrays having one output terminal and a plurality of input terminals;

each of said output terminals of said input switching arrays connected to a different one of said input terminals of said output switching arrays within each of said switching elements;

each of said input terminals of said input switching arrays of said first stage connected to a different one of said wideband signal sources, and each of said output terminals of said switching output arrays of said first stage connected to a different one of said input terminals of said input switching arrays of said second stage;

each of said output terminals of said switching output array of said second stage connected to a different one of said wideband signal receivers;

a switching controller for generating a plurality of control signals, one of said output arrays having a plurality of switching means with each one of said switching means associated with one of said input terminals and each of said switching means responsive to a first one of said control signals to connect said output terminal to said associated input terminal;

an impedance source;

one of said input arrays in the same switching element as said one of said output arrays having a plurality of switching means with each of said switching means associated with one of said output terminals, and each of said switching means responsive to a second one of said control signals to connect said impedance source to said associated output terminal;

said switching controller being operative to generate and transmit said second one of said control signals to the switching means in said one of said input arrays whose output terminal is connected to said one of said switching means in said one of said output arrays, whereby said output terminal of said output array is connected to said impedance source via said input array.

9. For use in a wideband switching system for the switching of wideband signals with a minimal of crosstalk between switched wideband signals;

a wideband switching network;

a plurality of wideband signal sources each of said sources transmitting a wideband signal to said network;

a plurality of wideband signal receivers each connected to said network and having capabilities of receiving one of said transmitted signals;

said network having a first and a second stage;

each of said stages having a plurality of switching elements;

each of said switching elements having a plurality of input switching arrays and a plurality of output switching array with each of said input switching arrays having one input terminal and a plurality of output terminals and each of said output switching arrays having one output terminal and a plurality of input terminals;

each of said output terminals of said input switching arrays connected to a different one of said input terminals of said output switching arrays within each of said switching elements;

each of said input terminals of said input switching arrays of said first stage connected to a different one of said wideband signal sources, and each of said output terminals of said switching output arrays of said first stage connected to a different one of said input terminals of said input switching arrays of said second stage;

each of said output terminals of said switching output array of said second stage connected to a different one of said wideband signal receivers;

a switching controller for generating a plurality of control signals;

a video switch for switching video signals from a video vendor to a video customer;

said video switch having input and output stages;

each of said input stages having a plurality of switching devices for connecting a single video input signal to any one of a plurality of output terminals of said input stages;

each of said output stages having a plurality of switching devices each of which has an individual input terminal connected to an individual one of said output terminals of said input stage and each of said output stage having a single output terminal;

a control means responsive to a receipt of said control signals for activating selected ones of said switching devices in said input and output stages for establishing a video switching path between said video vendor and said video customer.

10. The invention of claim 9 wherein said wideband further comprises a plurality of video customers; and said control means further comprises means responsive to other control signals for activating selected ones of said switching devices in said input and output stages for connecting said plurality of video customers to said video vendor.

11. For use in a wideband switching system for the switching of wideband signals with a minimal of crosstalk between switched wideband signals:

a wideband switching network;

a plurality of wideband signal sources each of said sources transmitting a wideband signal to said network;

a plurality of wideband signal receivers each connected to said network and having capabilities of receiving one of said transmitted signals;

said network having a first and a second stage;

each of said stages having a plurality of switching elements;

each of said switching elements having a plurality of input switching arrays and a plurality of output switching array with each of said input switching arrays having one input terminal and a plurality of output terminals and each of said output switching arrays having one output terminal and a pluality of input terminals;

each of said output terminals of said input switching arrays connected to a different one of said input terminals of said output switching arrays within each of said switching elements;

each of said input terminals of said input switching arrays of said first stage connected to a different one of said wideband signal sources, and each of said output terminals of said switching output arrays of said first stage connected to a different one of said input terminals of said input switching arrays of said second stage;

each of said output terminals of said switching output array of said second stage connected to a different one of said wideband signal receivers;

a switching controller for generating a plurality of control signals;

an impedance source;

each of said input arrays having a plurality of switching means with each of said switching means associated with one of said output terminals and having a first crosspoint device responsive to a first one of said control signals for connecting said associated output terminal to said input terminal and having a second crosspoint device responsive to a second one of said control signals for connecting said associated output terminal to said impedance source;

each of said output arrays having a plurality of switching apparatus with each of said switching apparatus associated with one of said input terminals and having a first crosspoint device responsive to said first one of said control signals for connecting said associated input terminal to said output terminal and a second crosspoint device responsive to said second one of said control signals for connecting said associated input terminal to said impedance source;

in the idle state of one of said switching elements, said switching controller generates and transmits said second one of said control signals to each of said switching means and switching apparatus within all of said input and output arrays, respectively;

said switching controller interconnects a wideband signal connected to one of said input terminals of said one of said switching elements to one of said output terminals by generating and transmitting said first one of said control signals to said switching means and switching apparatus in ones of said input and output arrays, respectively, which are associated with said one of said input terminals and said one of said output terminals and generates and transmits said second one of said control signals to all other of said switching means and switching apparatus.

12. A wideband switching network for switching wideband signals with a minimal of crosstalk between a plurality of wideband signal sources and a plurality of wideband receivers, comprises a source of potential;

a plurality of input switching arrays each having a single input terminal and a plurality of output terminals and each comprising a first set of crosspoints for connecting that input switching array's input terminal to one of that input switching array's output terminals and a second set of crosspoints for connecting all other output terminals of that input switching array to said source of potential;

a plurality of output switching arrays each having a single output terminus and a plurality of input termini and each comprising a third set of crosspoints for connecting that output switching array's output terminus to one of that output switching array's input termini and a fourth set of crosspoints for connecting all other input termini of that output switching array to said source of potential; and means for connecting each of said input termini to an individual one of said output terminals.

* * * * *

UNITED STATES PATENT AND TRADEMARK OFFICE
CERTIFICATE OF CORRECTION

PATENT NO. : 4,402,008

DATED : August 30, 1983

INVENTOR(S) : Kari T. Teraslinna

It is certified that error appears in the above-identified patent and that said Letters Patent is hereby corrected as shown below:

Column 8, line 23, "an" should read -- and --.

Signed and Sealed this

Twenty-sixth Day of February 1985

[SEAL]

Attest:

DONALD J. QUIGG

Attesting Officer     Acting Commissioner of Patents and Trademarks